(12) United States Patent
Hafenrichter et al.

(10) Patent No.: US 11,685,508 B2
(45) Date of Patent: Jun. 27, 2023

(54) SYSTEMS AND METHODS FOR CONSTRUCTING A BONDED STRUCTURE

(71) Applicant: The Boeing Company, Chicago, IL (US)

(72) Inventors: Joseph L. Hafenrichter, Chicago, IL (US); Gary E. Georgeson, Chicago, IL (US); Marc J. Piehl, Chicago, IL (US)

(73) Assignee: The Boeing Company, Chicago, IL (US)

( * ) Notice: Subject to any disclaimer, the term of this patent is extended or adjusted under 35 U.S.C. 154(b) by 365 days.

(21) Appl. No.: 16/843,534

(22) Filed: Apr. 8, 2020

(65) Prior Publication Data

US 2021/0316837 A1    Oct. 14, 2021

(51) Int. Cl.
*B64C 3/26* (2006.01)
*B64C 3/24* (2006.01)
*B29C 35/02* (2006.01)
*B29L 31/30* (2006.01)
*B64F 5/10* (2017.01)

(52) U.S. Cl.
CPC ............ *B64C 3/26* (2013.01); *B29C 35/0227* (2013.01); *B64C 3/24* (2013.01); *B29L 2031/3085* (2013.01); *B64F 5/10* (2017.01)

(58) Field of Classification Search
CPC ........... B64C 3/18; B64C 3/182; B64C 3/187; B64C 3/26; B29C 35/0227
See application file for complete search history.

(56) References Cited

U.S. PATENT DOCUMENTS

| | | | | |
|---|---|---|---|---|
| 2,140,672 A | * | 12/1938 | Gray | B64D 37/02 114/224 |
| 5,461,534 A | * | 10/1995 | Gondot | B64D 45/02 174/2 |
| 6,320,118 B1 | * | 11/2001 | Pridham | B29C 66/524 361/216 |
| 7,037,568 B1 | * | 5/2006 | Rogers | B32B 7/04 428/167 |

(Continued)

FOREIGN PATENT DOCUMENTS

GB    876438 A  *  8/1961  ............... B64C 3/26

*Primary Examiner* — Michael H Wang
(74) *Attorney, Agent, or Firm* — McDonnell Boehnen Hulbert & Berghoff LLP

(57) ABSTRACT

A bonded structure is described. The bonded structure includes an outer structure including a close tolerance hole associated with a first accuracy level. The bonded structure includes an interior structure comprising an oversized hole associated with a second accuracy level that is different from the first accuracy level. The bonded structure includes an elastomeric grommet disposed in the oversized hole. The bonded structure includes one or more spacers between the outer structure and the interior structure providing a space between the outer structure and the interior structure. The bonded structure includes a fastener positioned in the close tolerance hole and in the oversized hole. The bonded structure includes a bonding media disposed in the space between the outer structure and the interior structure via one or more channels of the fastener. The bonding media, elastomeric grommet, and oversized hole collectively position the interior structure relative to the outer structure.

20 Claims, 11 Drawing Sheets

(56) References Cited

U.S. PATENT DOCUMENTS

| | | | |
|---|---|---|---|
| 7,347,641 B2* | 3/2008 | Prichard | B29C 66/41 |
| | | | 411/501 |
| 8,844,868 B2* | 9/2014 | Kolax | B64C 1/064 |
| | | | 244/119 |
| 9,139,284 B1* | 9/2015 | Dhall | B64C 3/26 |
| 10,329,030 B2* | 6/2019 | Schaaf | B29D 99/0005 |
| 2011/0147522 A1* | 6/2011 | Williams | B64C 3/187 |
| | | | 244/123.1 |
| 2016/0229552 A1* | 8/2016 | Gross | F16B 1/00 |
| 2017/0253346 A1* | 9/2017 | Schaaf | B64C 1/00 |

* cited by examiner

600 ↘

┌─────────────────────────────────────────────────────────────────┐
│ POSITIONING AN OUTER STRUCTURE AND AN INTERIOR STRUCTURE        │
│ RELATIVE TO ONE ANOTHER SUCH THAT A SPACE FOR RECEIVING         │ 602
│ BONDING MEDIA IS PROVIDED BETWEEN THE OUTER STRUCTURE AND       │
│ THE INTERIOR STRUCTURE, WHEREIN THE OUTER STRUCTURE             │
│ COMPRISES A CLOSE TOLERANCE HOLE ASSOCIATED WITH A FIRST        │
│ ACCURACY LEVEL, AND THE INTERIOR STRUCTURE COMPRISES AN         │
│ OVERSIZED HOLE ASSOCIATED WITH A SECOND ACCURACY LEVEL THAT     │
│ IS DIFFERENT FROM THE FIRST ACCURACY LEVEL                      │
└─────────────────────────────────────────────────────────────────┘
                                    ↓
┌─────────────────────────────────────────────────────────────────┐
│ INSERTING A FASTENER IN THE CLOSE TOLERANCE HOLE AND IN AN      │
│ ELASTOMERIC GROMMET DISPOSED IN THE OVERSIZED HOLE, WHEREIN     │ 604
│ THE FASTENER COMPRISES ONE OR MORE CHANNELS                     │
└─────────────────────────────────────────────────────────────────┘
                                    ↓
┌─────────────────────────────────────────────────────────────────┐
│ INJECTING A BONDING MEDIA THROUGH THE FASTENER, SUCH THAT THE   │
│ BONDING MEDIA FLOWS OUT OF THE FASTENER AND INTO THE SPACE      │ 606
│ BETWEEN THE OUTER STRUCTURE AND THE INTERIOR STRUCTURE          │
└─────────────────────────────────────────────────────────────────┘
                                    ↓
┌─────────────────────────────────────────────────────────────────┐
│ CURING THE BONDING MEDIA TO BOND THE OUTER STRUCTURE TO THE     │
│ INTERIOR STRUCTURE, WHEREIN THE BONDING MEDIA, THE              │ 608
│ ELASTOMERIC GROMMET, AND THE OVERSIZED HOLE COLLECTIVELY        │
│ POSITION THE INTERIOR STRUCTURE RELATIVE TO THE OUTER           │
│ STRUCTURE                                                       │
└─────────────────────────────────────────────────────────────────┘

FIGURE 6

SYSTEMS AND METHODS FOR CONSTRUCTING A BONDED STRUCTURE

FIELD

The present disclosure relates generally to forming a bonded structure. In particular, the present disclosure relates to using a partially constrained system to form one or more bonded structures.

BACKGROUND

Wings used in aircraft include several bonded members that are subject to different accuracy constraints. For example, exterior surfaces, and the structures used to provide support for those surfaces, may be subject to relatively restrictive constraints to ensure that the wing is constructed in accordance with design plans for the wing. Internal support structures may have more permissive constraints in order to facilitate construction of the wing, because compounding errors in the exterior surfaces (e.g., due to variations in machining), though minor, can prevent effective assembly of the interior structures.

In some contexts, it is desirable to allow internal structures to have leeway to move relative to outer structures within predetermined constraints during assembly. This relatively minor freedom of movement is sometimes referred to as "float." After assembly of the internal and outer structures, the internal structures no longer should float relative to the outer structures, and so can be bonded to the outer structures using various bonding media.

What is needed is a system that allows for partially constraining movement of an internal structure relative to an outer structure in order to form a bonded structure during assembly of a wing.

SUMMARY

In an example, bonded structure is described. The bonded structure includes an outer structure comprising a close tolerance hole associated with a first accuracy level. The bonded structure includes an interior structure comprising an oversized hole associated with a second accuracy level that is different from the first accuracy level. The bonded structure includes an elastomeric grommet disposed in the oversized hole. The bonded structure includes one or more spacers between the outer structure and the interior structure providing a space between the outer structure and the interior structure. The bonded structure includes a fastener positioned in the close tolerance hole and in the oversized hole, wherein the fastener comprises one or more channels. The bonded structure includes a bonding media disposed in the space between the outer structure and the interior structure via the one or more channels of the fastener, wherein the bonding media, the elastomeric grommet, and the oversized hole collectively position the interior structure relative to the outer structure.

In another example, a method for forming a bonded structure is described. The method includes positioning an outer structure and an interior structure relative to one another such that a space for receiving bonding media is provided between the outer structure and the interior structure, wherein the outer structure comprises a close tolerance hole associated with a first accuracy level, and the interior structure comprises an oversized hole associated with a second accuracy level that is different from the first accuracy level. The method includes inserting a fastener in the close tolerance hole and in an elastomeric grommet disposed in the oversized hole, wherein the fastener comprises one or more channels. The method includes injecting a bonding media through the fastener, such that the bonding media flows out of the fastener and into the space between the outer structure and the interior structure. The method includes curing the bonding media to bond the outer structure to the interior structure, wherein the bonding media, the elastomeric grommet, and the oversized hole collectively position the interior structure relative to the outer structure.

In another example, a system for forming a bonded wing is described. The system includes a wing box. The system includes a plurality of wing ribs. The system includes a plurality of longerons. The system includes a wing skin covering the wing box, the plurality of wing ribs, and the plurality of longerons. The system includes a plurality of bonded structures. Each bonded structure includes an outer structure corresponding to the wing box, wherein the outer structure comprises a close tolerance hole associated with a first accuracy level. Each bonded structure includes an interior structure corresponding to a wing rib of the plurality of wing ribs, wherein the interior structure comprises an oversized hole associated with a second accuracy level that is different from the first accuracy level. Each bonded structure includes an elastomeric grommet disposed in the oversized hole. Each bonded structure includes one or more spacers between the outer structure and the interior structure providing a space between the outer structure and the interior structure. Each bonded structure includes a fastener positioned in the close tolerance hole and in the oversized hole, wherein the fastener comprises one or more channels. Each bonded structure includes a bonding media disposed in the space between the outer structure and the interior structure via the one or more channels of the fastener, wherein the bonding media, the elastomeric grommet, and the oversized hole collectively position the interior structure relative to the outer structure.

The features, functions, and advantages that have been discussed can be achieved independently in various examples or may be combined in yet other examples. Further details of the examples can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 6 illustrates a flowchart of a method forming a bonded structure, according to an example implementation.

DETAILED DESCRIPTION

Figure 1A:
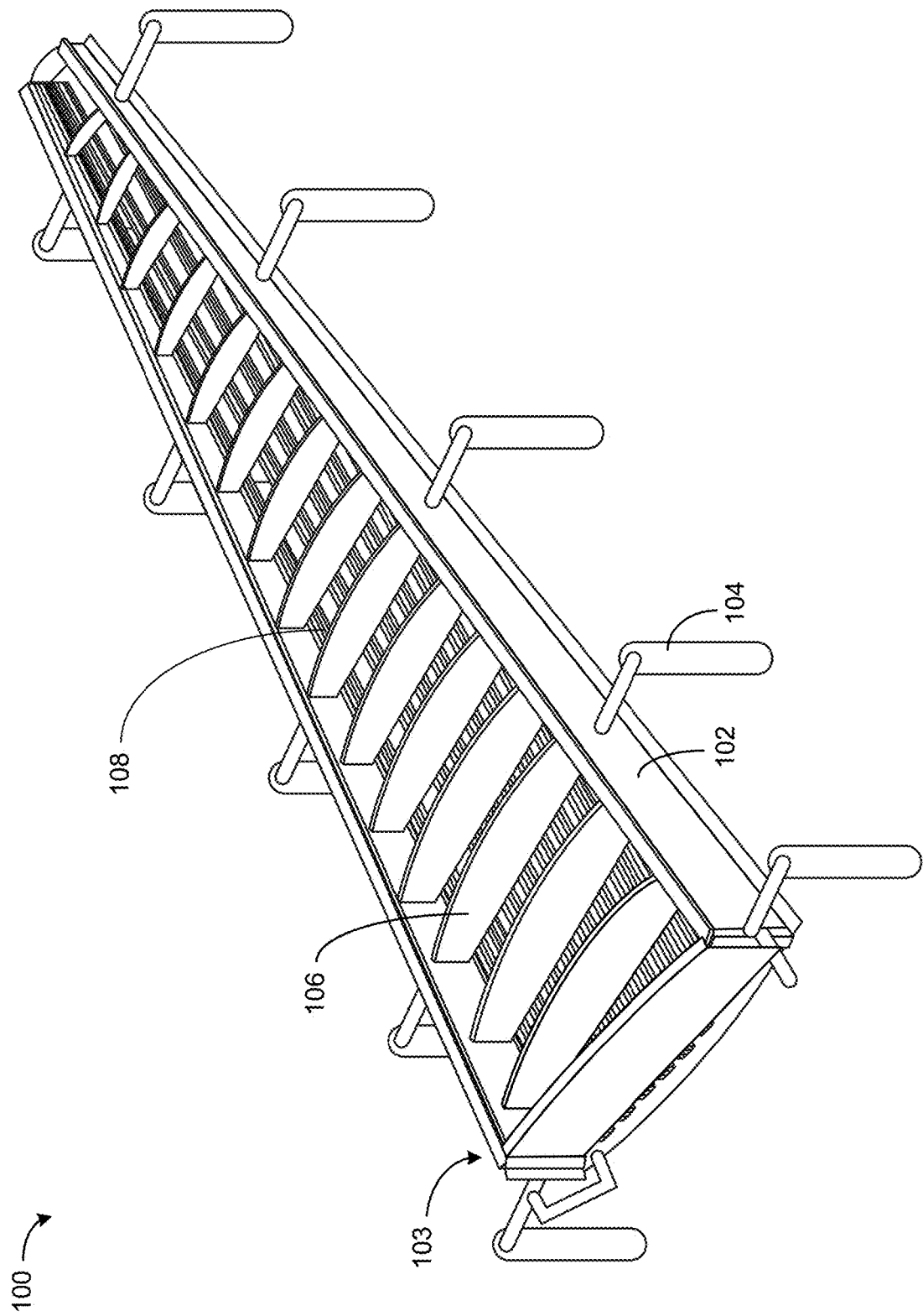
FIG. 1A illustrates a partially assembled wing, according to an example implementation.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Within examples, systems and methods for forming bonded structures are provided. In particular, forming the bonded structures is described in the context of assembling a wing. However, it should be understood that the context of wing assembly is only one example of many in which a partially constrained system can be used to form a bonded structure. For instance, the partially constrained system can be used to form a bonded structure for other aircraft components. Other example contexts for such assembly can be found in automotive, maritime, aeronautic, or astronautic implementations. Other implementations of the following examples are possible.

Example systems and methods involve a partially constrained system for forming a bonded structure. In the partially constrained system, an outer structure and an interior structure are provided to form the bonded structure. The outer structure includes close tolerance hole that is machined in accordance with a first accuracy level. The first accuracy level may correspond to design plans of a system, which may require relatively precise locations and orientations for outer structures. As used herein, a "close tolerance" refers to a hole that is within a predefined diameter of a fastener to be inserted in the hole. For example, the close tolerance hole can be machined to within 1% of the diameter of the fastener. In another example, the close tolerance hole can be machined to within 0.1% to 0.5% of the diameter of the fastener. The interior structure may have an oversized hole that is machined in accordance with a second accuracy level. The second accuracy level may correspond to the design plans of the system, which may require less precise locations and orientations for inner structures. This results in the hole in the interior structure being "oversized" relative to the close tolerance hole. As used herein, the term "oversized hole" refers to a hole having a diameter that is larger than necessary to accept a fastener. An oversized hole can be large enough to be lined with an elastomeric grommet and still accept the fastener. For example, the oversized hole can be machined to within 10% of the diameter of the fastener, which allows the interior structure to "float" (i.e., move freely within constraints imposed by the oversized hole) relative to the outer structure having the close tolerance hole. Within examples, the diameter of the oversized hole can be equal in orthogonal dimensions (e.g., the oversized hole can be circular), allowing the interior structure to float relative to the outer structure in two-dimensions. In other examples, the diameter of the oversized hole can be different in orthogonal dimensions (e.g., the oversized hole can be a slot such as an ovular slot), allowing the interior structure to float in one dimension more so than another. For example, the oversized hole can be a slot that induces displacement of the interior structure towards the outer structure, and allows lateral movement relative to the outer structure. Allowing one or more interior structures to float in this manner may allow for simplified and expeditious assembly of the system. Within examples, this ability for one or more interior structures to float in this manner allows internal structures to have leeway to move relative to outer structures within predetermined constraints dui g an assembly process. This allows for a certain amount of flexibility, while also providing partial movement constraints, during the assembly process of large structures that have various outer structures and interior structures to be joined to one another.

Within examples, the interior structure and the outer structure are joined by a fastener having a channel used for providing a bonding media to a space between the interior structure and the outer structure. The channel can run from a first portion of the fastener (e.g., an insertion end of the fastener) to a portion of the fastener that is aligned with the space between the interior structure and the outer structure. Once the fastener is inserted through the close tolerance hole and the oversized hole to join the interior structure and the outer structure in a partially constrained manner, the bonding media can be provided to the space via the channel. The bonding media can then be cured to bond the interior structure to the outer structure and thereby form the bonded structure.

Within examples, the bonding media can be provided using an injection cartridge. The injection cartridge can be attached to the first portion of the fastener and provide the bonding media to the channel in the fastener. The cartridge can be configured such that the bonding media is passively provided during a curing process of the bonding media. For example, the bonding media can automatically be provided to the channel under first thermal conditions, and the bonding media can cure under second thermal conditions.

FIG. 1A illustrates a system 100 for forming a bonded wing, according to an example implementation. The system 100 includes a plurality of spars 102, which are held in place by a plurality of fixture arms 104. The plurality of fixture arms 104 are not included in the assembled wing, but are rather provided for purposes of assembly. Other fixtures or tools can be used for holding aspects of the system 100 in place during assembly. The system 100 further includes a plurality of wing ribs 106, which are attached between the spars 102. The system 100 further includes a plurality of longerons 108, which run parallel to the spars, and which provide an interface between the ribs and other aspects of the system 100. The longerons 108 may provide a flexibility and strength to the system 100.

The spars 102 can collectively form a portion of a wing box 103 that provides lateral structure to the system 100, and which provides the general shape and dimension of the system 100. Further, additional components of the system 100 may couple to the wing box 103. Accordingly, the dimensions of the spars 102 may strictly adhere to design plans for the wing. For similar reasons, holes in the spars 102 may be close tolerance holes, and therefore can fit the corresponding fasteners in accordance with a first accuracy level (e.g., within 1% of the diameter of the fastener). Within examples, a spar 102 can be considered an outer structure. However, other example outer structures are possible as well.

Figure 1B:
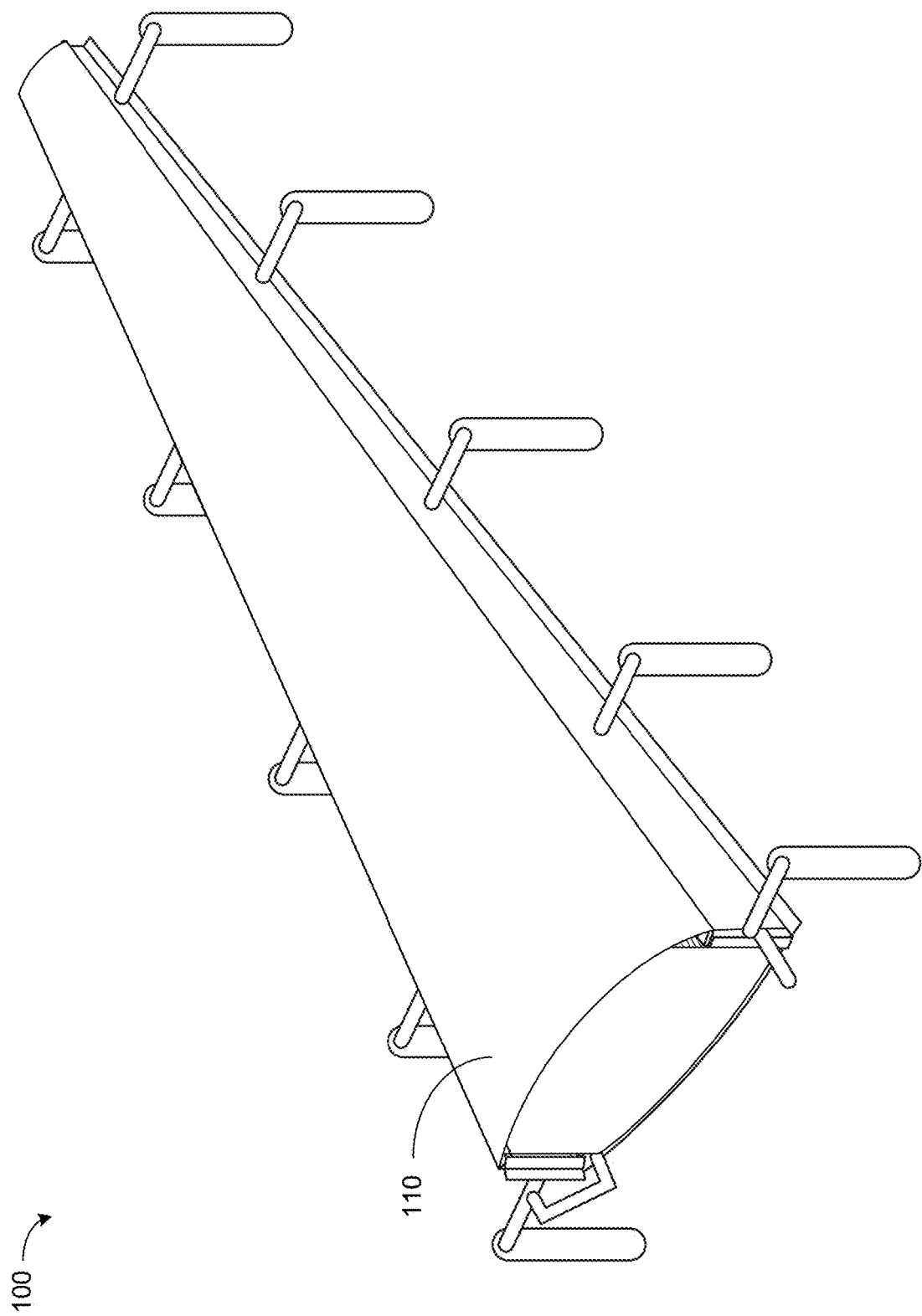
FIG. 1B illustrates a partially assembled wing, according to an example implementation.

FIG. 1B illustrates the system 100, according to an example implementation. In particular, FIG. 1B shows the system 100 with a portion of a wing skin 110 coupled to the spars 102, the wing ribs 106, and the longerons 108. Within examples, the wing skin 110 can be considered an outer structure. However, other example outer structures are possible as well.

Figure 2:
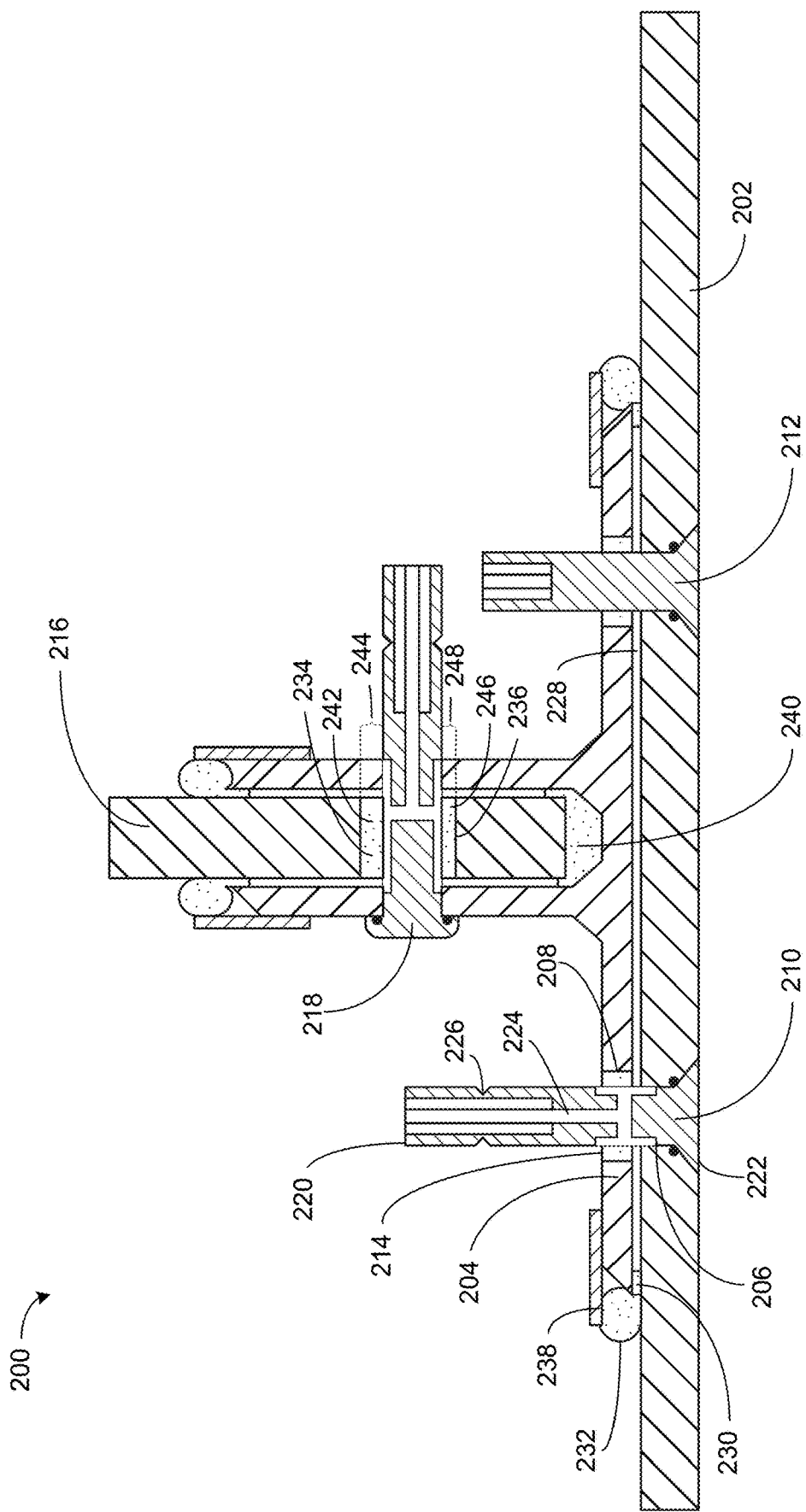
FIG. 2 illustrates a system for forming a bonded structure at a first time, according to an example implementation.
Figure 3:
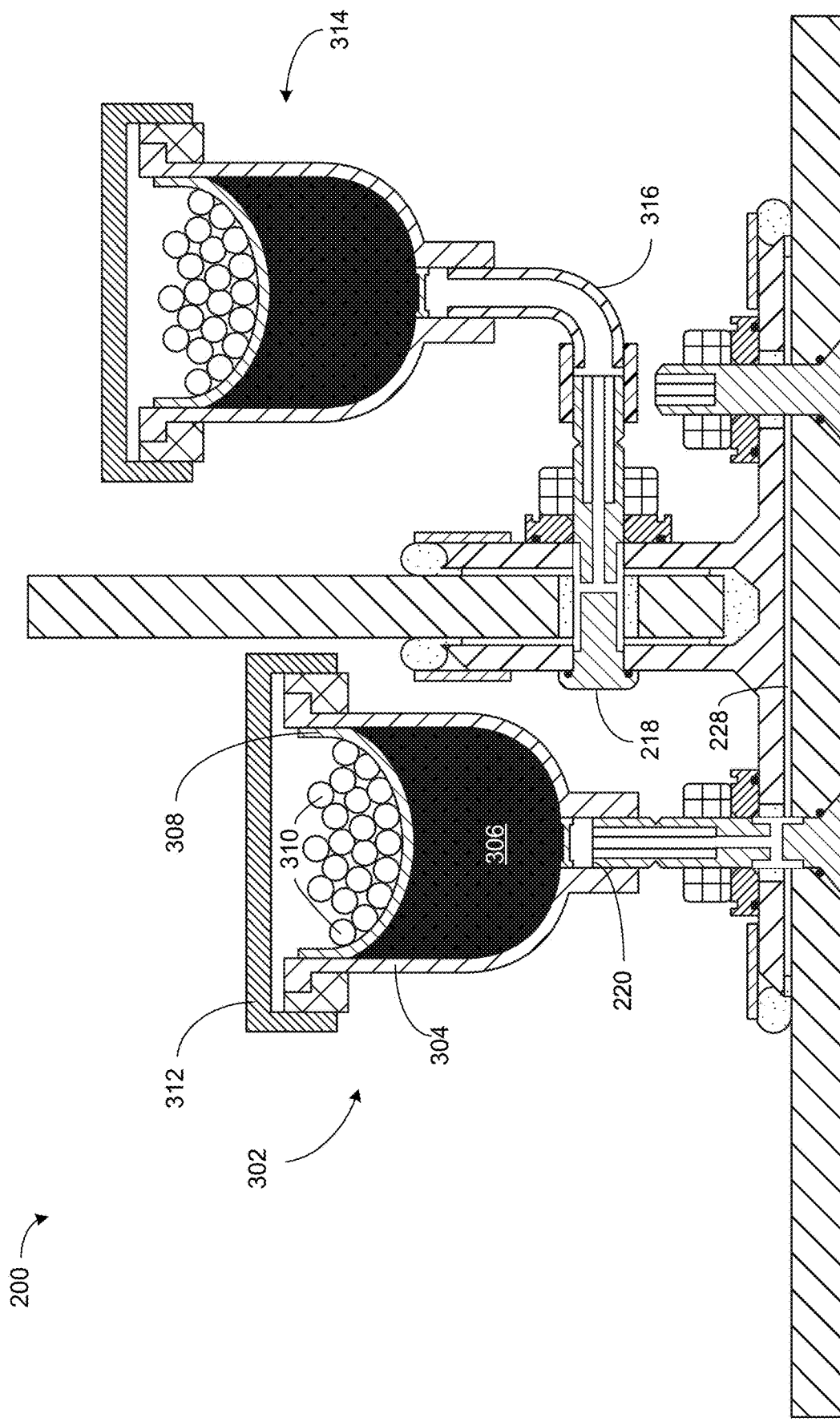
FIG. 3 illustrates a system for forming a bonded structure at a second time, according to an example implementation.
Figure 4:
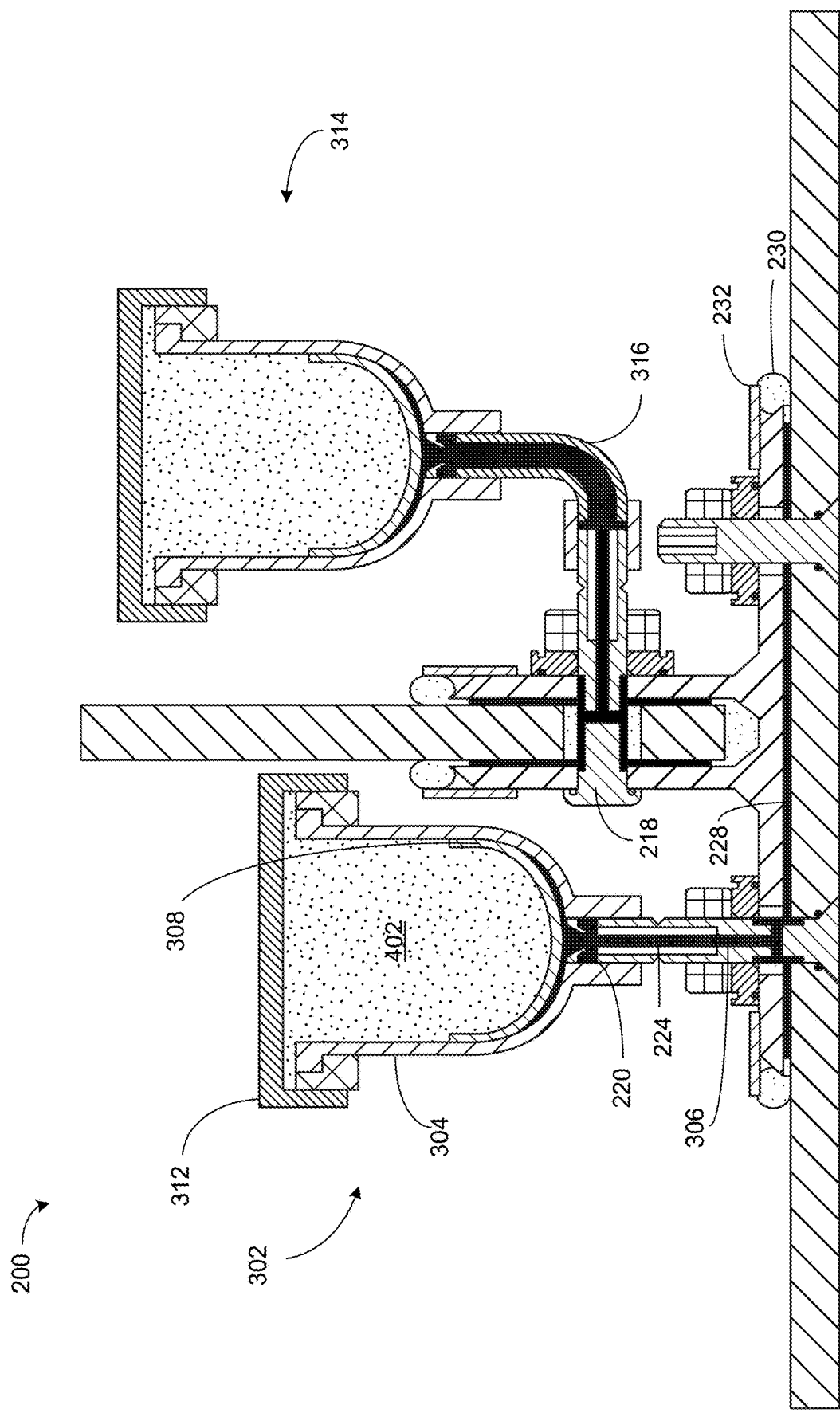
FIG. 4 illustrates a system for forming a bonded structure at a third time, according to an example implementation.

FIGS. 2-5 illustrate various example phases of formation of a bonded structure, according to an example implementation. For instance, FIGS. 2-4 illustrate a system 200 for forming bonded structure 500 shown in FIG. 5. FIG. 2 illustrates the system 200 for forming a bonded structure at a first time, according to an example implementation. In particular, FIG. 2 shows a cross-sectional view of an initial stage of forming a bonded structure. The bonded structure includes an outer structure 202 and an interior structure 204. In the system 200, the outer structure 202 can correspond to a wing skin (e.g., the wing skin 110), a portion of a spar (e.g., one of the spars 102), or another outer structure. The interior structure can correspond to a rib (e.g., one of the wing ribs 106), or another interior structure. In the example depicted in FIG. 2, the interior structure 204 is a bracket connected to a portion of a wing rib 216. The outer structure 202 includes a close tolerance hole 206, which accepts a fastener 210, and which has a first accuracy level relative to a diameter of the fastener 210. The interior structure 204 has an oversized hole 208, which is wide enough for an elastomeric grommet 214 while still accepting the fastener 210. Accordingly, the oversized hole 208 has a second accuracy level relative to the diameter of the fastener 210 that is less accurate than the first accuracy level. The second accuracy level being less accurate than the first accuracy level allows for the fastener to stay in place in the close tolerance hole (e.g., via frictional force between threads of the fastener 210 and threads of the close tolerance hole 206), while still allowing for the interior structure 204 to move freely relative to the outer structure 202 within the partial constraints of the oversized hole 208.

Fastener 212 is also disposed in a close tolerance hole in the outer structure 202 and an oversized hole in the interior structure 204. Fastener 218 is used to connect the portion of the wing rib 216 to the interior structure 204. While the fastener 218 is situated similarly to the fastener 210, the fastener 218 is connected through a first close tolerance hole in the interior structure 204, an oversized hole in the wing rib 216, and a second close tolerance hole in the interior structure 204. An elastomeric grommet is provided in the oversized hole, and an elastomeric plug 240 is provided prevent the portion of the wing rib 216 from touching a bottom portion of the bracket.

Within examples, the elastomeric grommets might have non-uniform thickness. For example, one or more elastomeric grommets in the system 200 can include a first thickness at a first end (e.g., a top portion) and a second thickness at a second end (e.g. a bottom portion). FIG. 2 shows an elastomeric grommet 234 associated with the fastener 218 that has a first thickness 244 at a first end 242, and has a second thickness 248 at a second end 246. In this example, the top portion of the elastomeric grommet 234 corresponds to the first end 242, and the bottom portion of the elastomeric grommet 234 corresponds to the second end 248. The first thickness 244 of the first end 242 is greater than the second thickness 248 of the second end 246, and the first end 242 and the second end 246 are positioned within the oversized hole 236 so as to displace the fastener 218 within the oversized hole 236. Thus, the first end 244 of the elastomeric grommet 234 can provide an additional downward force on the fastener 218 which in turn compresses the interior structure 204 towards the outer structure 202.

Returning to the fastener 210, the fastener 210 includes an insertion end 220 and a coupling end 222. The insertion end 220 is the first portion of the fastener 210 that passed through the close tolerance hole 206. The coupling end 222 is the last portion that is at least partially inserted in or passes through the close tolerance hole 206, and which couples to the outer structure 202. The fastener 210 further includes a channel 224 that originates at the insertion end 220, and the opens again at a second portion of the fastener 210. A space 228 is maintained between the outer structure 202 and the interior structure 204. The fastener 210 can be configured such that the second portion of the channel 224 aligns with the space, and allows for a bonding media to be provided from the insertion end 220 to the second portion of the channel 224. Accordingly, the fastener can be configured differently depending on the thickness of the outer structure 202 and the interior structure 204. The fastener 210 also includes a perforation 226. The perforation 226 is a weakened portion (e.g., a breakoff sprue) of the fastener 210 that can be removed after a bonding media has been provided and cured. This removal can allow for more space within the system 200 after the bonding media has cured.

Though the channel 224 is depicted as originating at the insertion end 220 of the fastener 210, the channel 224 can alternatively originate at the coupling end 222. In these examples, the perforation 226 can be provided at an exposed portion of the coupling end 222.

The fasteners described herein can be screws, bolts, rivets, or other components or devices configured to connect two members by being inserted between aligned holes in the two members. The fasteners can be composed of any material that can be machined to include the channel 224, including plastic materials and metallic materials.

The space 228 is maintained between the outer structure 202 and the interior structure 204 so that an uncured bonding media can be provided therein. The bonding media can be an adhesive or a resin that cures to form a bond between the outer structure 202 and the interior structure 204. In particular, this bond may be formed by a cured bonding media resulting from curing the uncured bonding media within the space 228. To maintain the space 228, one or more spacers 230 is provided at the edges of the interior structure 204. As described further below. One or more edge seals 232 are provided to hold the one or more spacers 230 in place when the bonding media is provided. In some examples, a pressure plate 238 can be used for each edge seal 232, and can be coupled to a portion of the interior structure 204. In other examples, an adhesive tape can be used to hold the one or more edge seals 232 in place. The edge seals can be temporary, and can be removed after the bonding media cures.

FIG. 2 shows a generic representation of the outer structure 202 and the interior structure 204, which can be implemented in many contexts. An example scenario for this assembly involves the system 100 shown in FIG. 1A and FIG. 1B. In this context, the outer structure 202 can be an edge of a spar, and the interior structure 204 can be a bracket used to connect a rib to the spar, longerons, and/or the wing skin. Accordingly, a process for assembling a wing can include positioning the spars, and connecting the ribs between the spars, which can correspond to positioning the outer structure 202 relative to the interior structure 204 so as to provide the space 228 between the outer structure 202 and the interior structure 204. The one or more spacers 230 can be used to maintain the space 228 at a predetermined distance. The oversized holes and the elastomeric grommets placed in the oversized holes can provide a degree of freedom of movement for the interior structure relative to the fasteners 210 and 212, which remain relatively stationary due to being placed through the close tolerance holes. Once the one or more spacers 230 and the interior structure 204 have been placed and the fasteners 210 and 218 have been positioned in respective holes, the one or more edge seals 232 are applied to the one or more spacers 230.

A similar assembly process may previously have taken place in this scenario for the interior structure 204 and the portion of the wing rib 216. As mentioned above, as shown in FIG. 2, the fastener 218 is connected through a first close tolerance hole in the interior structure 204, an oversized hole in the wing rib 216, and a second close tolerance hole in the interior structure 204. The interior structure 204 in this context serves as one bracket of a plurality of brackets for the wing rib 216, which may have several contacts in the system 200. In this context, the wing rib 216 can also be understood as being an interior structure, and indeed the wing rib 216 is configured as an interior structure relative to the interior structure 204. Thus, in this context, the interior structure 204 could be considered an outer structure comprising a close tolerance hole associated with a first accuracy level, and the wing rib 216 could be considered an interior structure comprising an oversized hole associated with a second accuracy level that is different from the first accuracy level.

At the time depicted in FIG. 2, no bonding media has been provided in the space 228 to bond the interior structure 204 and to the outer structure 202. Examples for providing the bonding media are described below with respect to FIG. 3 and FIG. 4.

FIG. 3 illustrates the system 200 for forming a bonded structure at a second time, according to an example implementation. In particular, FIG. 3 shows system 200 after a plurality of injection cartridges have been coupled to the fasteners in order to provide a bonding media to the space 228 between the outer structure and the interior structure. A first injection cartridge 302 is depicted, which includes a housing 304 that connects to the insertion end 220 of the fastener 210. The housing 304 holds a bonding media 306 (e.g., an adhesive or a resin), a diaphragm 308 in contact with the bonding media 306, and a plurality of thermally foamable pellets 310, which are in contact with the diaphragm 308, and which expand in response to being exposed to certain thermal conditions. The first injection cartridge 302 also includes a pressure cap 312 placed over the plurality of thermally foamable pellets 310, in order for pressure to build inside the housing 304 in response to the thermally foamable pellets 310 expanding.

System 200 further includes a second injection cartridge 314, which is configured similarly to the first injection cartridge 302. However, the second injection cartridge is connected to an insertion end of the fastener 218 via a flex hose 316. The flex hose 316 may be used to reach the insertion end of the fastener 218 even though the insertion end of the fastener 218 is in a constrained area of the assembly.

In the assembly process described above with respect to FIG. 2, an outer structure was connected to an inner structure using one or more fasteners. In FIG. 3, one or more injection cartridges are connected to the one or more fasteners in order to provide a bonding media. However, as shown in FIG. 3, no bonding media has yet been provided to the space 228 maintained between the outer structure and the inner structure. For example, this may be because initial thermal conditions (e.g., room temperature) present when installing the injection cartridges does not cause the thermally foamable pellets to expand. Providing the bonding media is described in further detail below with respect to FIG. 4. It should be understood that other types of injection cartridges, such as those attached to a pneumatic piston or solenoid can alternatively be used.

FIG. 4 illustrates the system 200 for forming a bonded structure at a third time, according to an example implementation. In particular, FIG. 4 shows system 200 after a plurality of injection cartridges have been coupled to the fasteners in order to provide a bonding media to the space 228 between the outer structure and the interior structure, and after the injection cartridges have been exposed to thermal conditions that cause the thermally foamable pellets 310 to expand. The thermally foamable pellets 310 can expand due to internal gas activation that applies pressure within the structure of the thermally foamable pellets 310. As shown in FIG. 4, the thermally foamable pellets 310 have been converted to an expanded state 402. As the thermally foamable pellets 310 expand into the expanded state 402, the pressure cap 312 contains the pellets in the diaphragm 308, which expands towards a bottom portion of the housing 304. This pushes the bonding media 306 out of the housing into the channel 224, which runs from the insertion end of the fastener 210 to a second portion of the fastener 210 that is aligned with the space 228 provided between the outer structure and the interior structure. The bonding media 306 is thus provided to the space 228 for curing, and is contained by the one or more spacers 230 with assistance from the one or more edge seals 232. The second injection cartridge 314 operates in a similar manner.

The thermal conditions that cause the thermally foamable pellets 310 to expand due to internal gas activation may result from providing a thermally-controllable chamber (e.g., a curing oven or a tent) over the system 200. For example, the system 100 can be placed in a thermally-controllable chamber, or a thermally-controllable chamber can be constructed over the system 100 after the injection cartridges have been placed on the insertion end of each fastener. Accordingly, as noted above, the assembly process shown in FIGS. 2, 3, and 4 can be combined in parallel to form a plurality of bonded surfaces. In the context of FIGS. 1A and 1B, this may involve each rib of the plurality of wing ribs 106 being bonded to the spars 102 and the wing skin 110.

The thermally foamable pellets 310 may expand to the expanded state 402 at a temperature that is less than the curing temperature (e.g., between 250 degrees Fahrenheit and 350 degrees Fahrenheit) so that the bonding media 306 can flow to the space 228 before curing. Accordingly, after providing the thermally-controllable chamber, the temperature increases from an initial thermal condition (e.g., room temperature) to a temperature between the initial thermal condition and the curing temperature, which results in the bonding media being provided via the channel 224 to the space 228, and the temperature can continue to increase to the curing temperature for a predetermined period during which the bonding media cures, thereby forming the bonded structure. Other ways of providing the bonding media 306 can be used, such as pneumatic pressure from a piston, or force generated by a solenoid. Using the thermally foamable pellets 310 provides a way of automatically providing the bonding media 306 while increasing thermal conditions of the system 200 to reach the curing temperature.

Within examples, different types of thermally foamable pellets can expand at different temperatures. Because different curing temperatures can be used depending on the bonding media used to form the bonded structure, a type of thermally foamable pellet can be selected based on the bonding media, or more generally based on a desired provision temperature for providing the bonding media to the space between the internal structure and the outer structure. For example, the provision temperature can be between 100 and 200 degrees Fahrenheit.

The FIGS. 3 and 4 focus on thermally foamable pellets that expand responsive to changes in an applied thermal condition, other types of thermo-responsive materials or chemical agents could be used to achieve a similar effect. In other examples, a chemical activation process involving two or more chemical components (e.g., including an activated carbon) could be introduced to an injection cartridge to emit gas and thereby expand the diaphragm to provide the bonding media. Other ways of providing the bonding media are possible.

Figure 5:
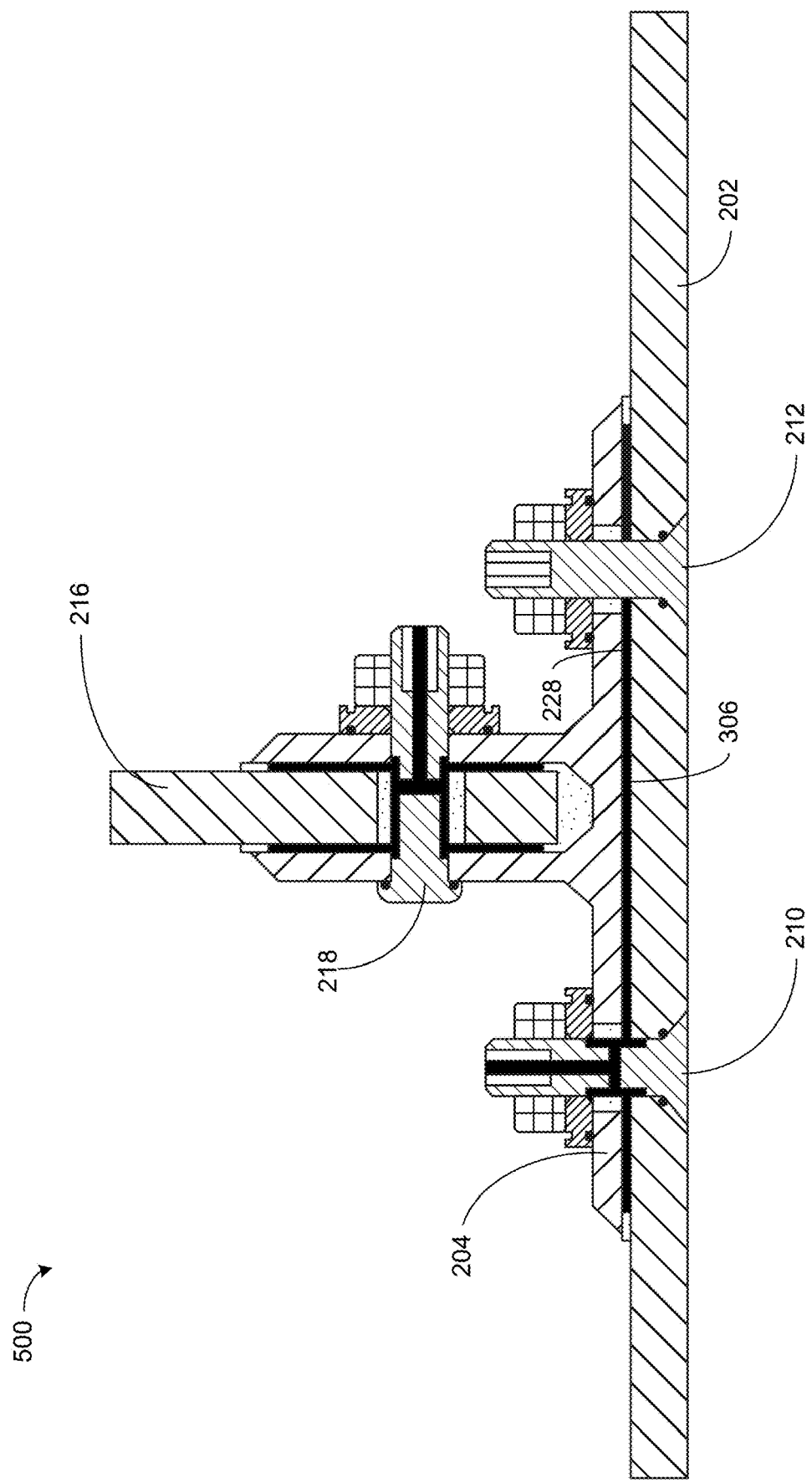
FIG. 5 illustrates a bonded structure, according to an example implementation.

FIG. 5 illustrates a bonded structure 500, according to an example implementation. In particular, FIG. 5 shows a result of the assembly process depicted in FIGS. 2, 3, and 4. The pressure plate 238 is configured for removal and each edge seal is configured for removal. Thus, after curing the bonding media 306 to form the bonded structure 500, the first injection cartridge 302 and second injection cartridge 314 are removed, the pressure plate 238 is removed, the one or more edge seals 232 are removed (perhaps along with the spacers 230), and the fasteners 210 and 218 can be shortened at their respective perforations. In this manner, a bonded structure is formed in which the outer structure 202 is coupled to the interior structure 204 using the fasteners 210 and 212, and the bonding media 306 filling the space 228 between the outer structure 202 and the interior structure 204. Similarly, the portion of the wing rib 216 is bonded to the interior structure 204 via the fastener 218 and the bonding media 306.

As noted above, the bonded structure 500 can be assembled in the context of forming a wing. For example, the wing can include a wing box, and the outer structure can correspond to the wing box. Further, the wing can include a wing rib, and the interior structure can correspond to the wing rib. For instance, in an example, the interior structure corresponding to the wing rib is a bracket connected to the wing rib. In another example, the interior structure corresponding to the wing rib is the wing rib itself. Still further, the wing can include a plurality of longerons. The close tolerance hole can correspond to a connection to the wing box, and the oversized hole can correspond to a connection to a longeron of the plurality of longerons. For instance, in an example, the close tolerance hole is a hole in the wing box, and the oversized hole is a hole in the longeron. The wing can also include a wing skin. The oversized hole can exert a force on the elastomeric grommet to push the fastener towards the longeron thereby causing the longeron to make intimate contact with the wing skin. Other types of bonded connections are possible in the context of assembling a wing.

Further, assembling a bonded structure can be performed in parallel to form a component, such as a wing of an aircraft, having several bonded structures. For example, the system 100, the system 200, and the bonded structure 500, can be part of a system for forming a wing having a plurality of bonded structures. The wing can include a wing box, a plurality of wing ribs, a plurality of longerons, a wing skin covering the wing box, the plurality of wing ribs, and the plurality of longerons, and a plurality of bonded structures. Each bonded structure can include an outer structure corresponding to the wing box, and the outer structure can include a close tolerance hole associated with a first accuracy level. Each bonded structure can include an interior structure corresponding to a wing rib of the plurality of wing ribs (e.g., the interior structure can be a bracket connected to a wing rib). The interior structure can include an oversized hole associated with a second accuracy level that is different from the first accuracy level. Each bonded structure can include an elastomeric grommet disposed in the oversized hole. Each bonded structure can include one or more spacers between the outer structure and the interior structure providing a space between the outer structure and the interior structure. Each bonded structure can include a fastener positioned in the close tolerance hole and in the oversized hole, and the fastener can include one or more channels. Each bonded structure can include a bonding media disposed in the space between the outer structure and the interior structure via the one or more channels of the fastener. For each bonded structure, the bonding media, the elastomeric grommet, and the oversized hole can collectively position the interior structure relative to the outer structure. For example, each bonded structure can be formed substantially as shown in FIGS. 2, 3, and 4, and the bonding media for each bonded structure can be cured at the same time.

FIG. 6 illustrates a flowchart of a method forming a bonded structure, according to an example implementation. Method 600 shown in FIG. 6 presents an example of a method that could be used with the system 100 and system 200 shown in FIGS. 1, 2, 3 and 4, a combination thereof, or with components of thereof. Further, the functions described with respect to FIG. 6 may be supplemented by, replaced by, or combined with functions described above with respect to FIGS. 1A-B, 2, 3, 4, and 5. Further, devices or systems may be used or configured to perform logical functions presented in FIG. 6.

In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 600 includes one or more operations, functions, or actions as illustrated by one or more of blocks 602-608. Further, blocks 610-632 (see FIGS. 7-14) of the method 600 may be performed in accordance with one or more of block 602-608. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. In this regard, each block or portions of each block may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In addition, each block or portions of each block in FIG. 6, and within other processes and methods disclosed herein, may represent circuitry that is wired to perform the specific logical functions in the process. Alternative implementations are included within the scope of the examples of the present disclosure in which functions may be executed out of order from that shown or discussed, including substantially concurrent or in reverse order, depending on the functionality involved, as would be understood by those reasonably skilled in the art.

Within examples, one or more blocks of the method 600 may be represented in program code or circuitry used for controlling robotic mechanisms for assembling a bonded structure and/or a wing including a plurality of bonded structures. While method 600 and variations thereof may be executed automatically using, for example, one or more robotic armatures controlled by program code operating in accordance with the method 600, some tasks may be performed manually. Thus, within examples, certain functionality described with respect to the method 600 may be performed automatically while other portions can be performed manually. Alternatively, all blocks of the method 600 may be performed automatically or all blocks of the method 600 may be performed manually.

At block 602, the method 600 includes positioning an outer structure 202 and an interior structure 204 relative to one another such that a space 228 for receiving bonding media 306 is provided between the outer structure 202 and the interior structure 204. For example, this may correspond to positioning a rib of an aircraft wing adjacent to an edge of a wing spar, a longeron, or a wing skin. The outer structure includes a close tolerance hole 206 associated with a first accuracy level, and the interior structure includes an oversized hole 208 associated with a second accuracy level that is different from the first accuracy level. For example, the second accuracy level may be less accurate (i.e., less similar to a diameter of a fastener) than the first accuracy level.

At block 604, the method 600 includes inserting a fastener 210 in the close tolerance hole 206 and in an elastomeric grommet 214 disposed in the oversized hole 208. The fastener includes one or more channels (e.g., the channel 224). Within examples, the fastener can include a screw, a bolt, or another fastener configured to be inserted through two holes to form a connection.

At block 606, the method 600 includes injecting a bonding media 306 through the fastener 210, such that the bonding media 306 flows out of the fastener 210 and into the space 228 between the outer structure 202 and the interior structure 204. For example, this may be performed as described above with respect to FIG. 4. Alternatively, a pneumatic pressure can be used to inject the bonding media, or a solenoid can generate a force to inject the bonding media 306.

At block 608, the method 600 includes curing the bonding media 306 to bond the outer structure 202 to the interior structure 204. The bonding media 306, the elastomeric grommet 214, and the oversized hole 208 collectively position the interior structure 204 relative to the outer structure 202. For example, while the oversized hole 208 can permit the interior structure 204 to "float" relative to the outer structure 202, force exerted by the fastener 210, the elastomeric grommet 214, and the oversized hole 208 may position the interior structure 204 while the bonding media 306 cures. Then the bonding media 306 can exert a force to hold the interior structure 204 in place.

Figure 7:
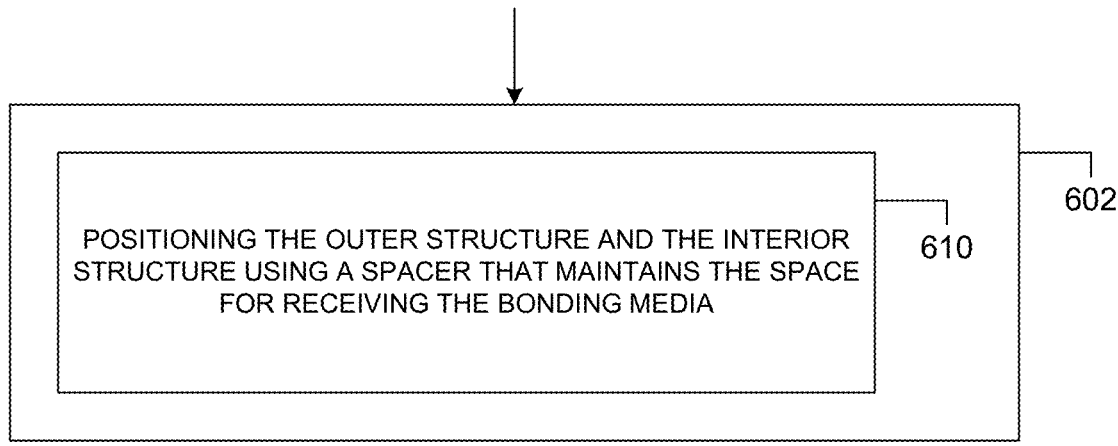
FIG. 7 illustrates a flowchart of a method for use with the method shown in FIG. 6, according to an example implementation.

FIG. 7 illustrates a flowchart of a method for use with the method 600 shown in FIG. 6, according to an example implementation. In particular, FIG. 7 illustrates block 610, which is performed in accordance with block 602. At block 610, the method 600 includes positioning the outer structure 202 and the interior structure 204 using a spacer 230 that maintains the space 228 for receiving the bonding media 306. For example, this may be performed as described above with respect to FIG. 2.

Figure 8:
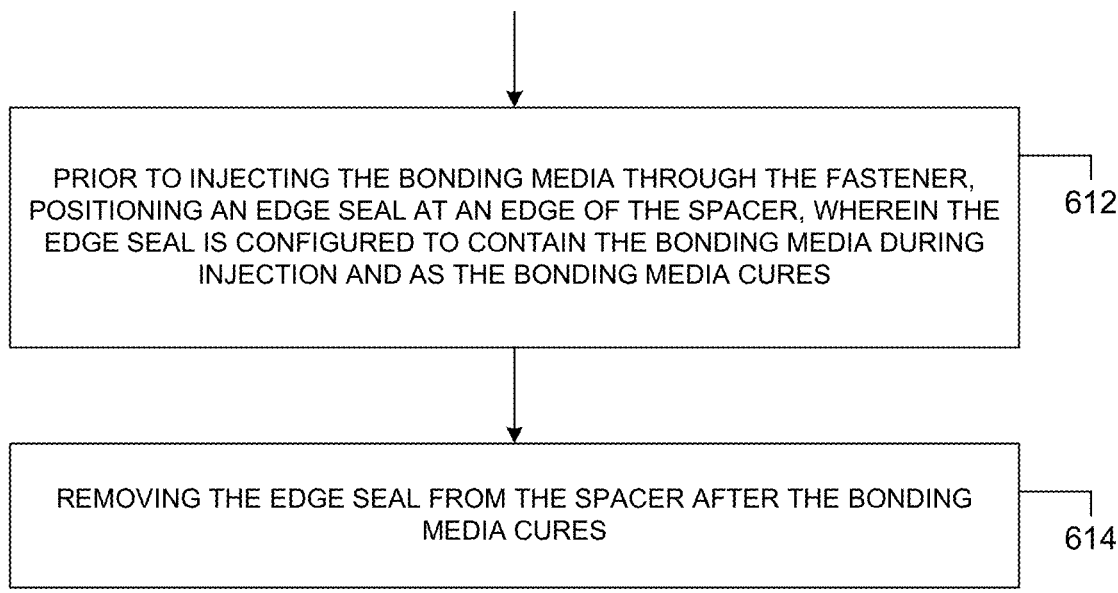
FIG. 8 illustrates a flowchart of a method for use with the method shown in FIG. 6, according to an example implementation.

FIG. 8 illustrates a flowchart of a method for use with the method 600 shown in FIG. 6, according to an example implementation. In particular, FIG. 8 illustrates blocks 612 and 614. At block 612, the method 600 includes, prior to injecting the bonding media 306 through the fastener 210, positioning an edge seal 232 at an edge of the spacer 230. For example, this may be performed as described above with respect to FIG. 2. The one or more spacers 230 can be configured to contain the bonding media 306 during injection and as the bonding media 306 cures. In addition, the edge seal 232 may provide assistance maintaining a seal for the space 228 against the pressure resulting from injecting the bonding media 306. At block 614, the method 600 includes removing the edge seal 232 from the spacer after the bonding media cures.

Figure 9:
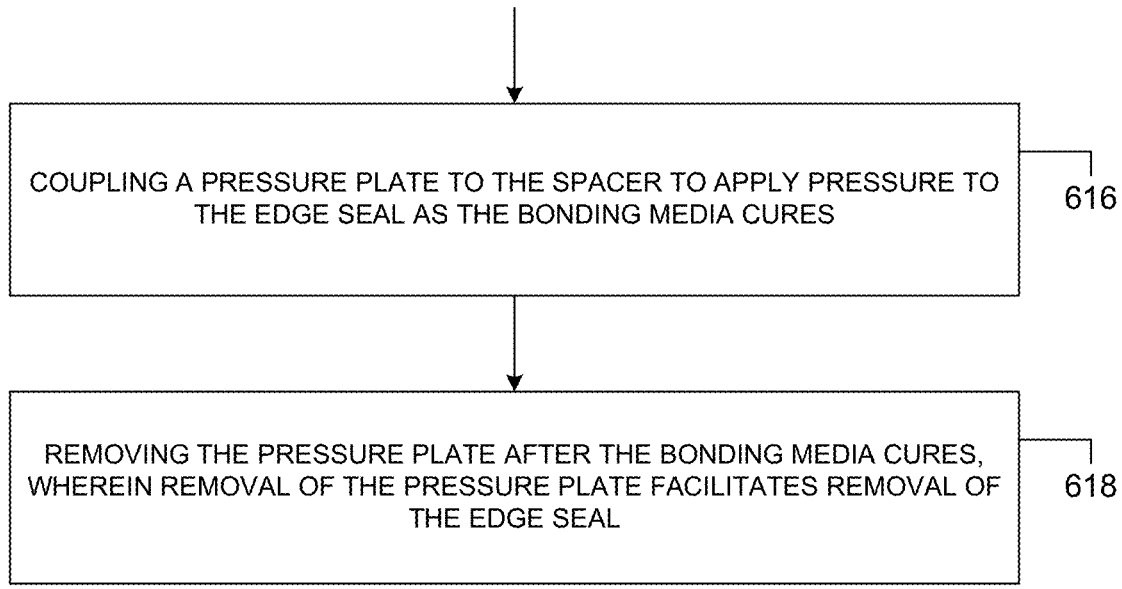
FIG. 9 illustrates a flowchart of a method for use with the method shown in FIG. 6, according to an example implementation.

FIG. 9 illustrates a flowchart of a method for use with the method 600 shown in FIG. 6, according to an example implementation. In particular, FIG. 9 illustrates blocks 616 and 618. At block 616, the method 600 includes coupling a pressure plate 238 to the spacer 230 to apply pressure to the edge seal 232 as the bonding media 306 cures. At block 618, the method 600 includes removing the pressure plate 238 after the bonding media 306 cures. Removal of the pressure plate 238 facilitates removal of the edge seal 232.

Figure 10:
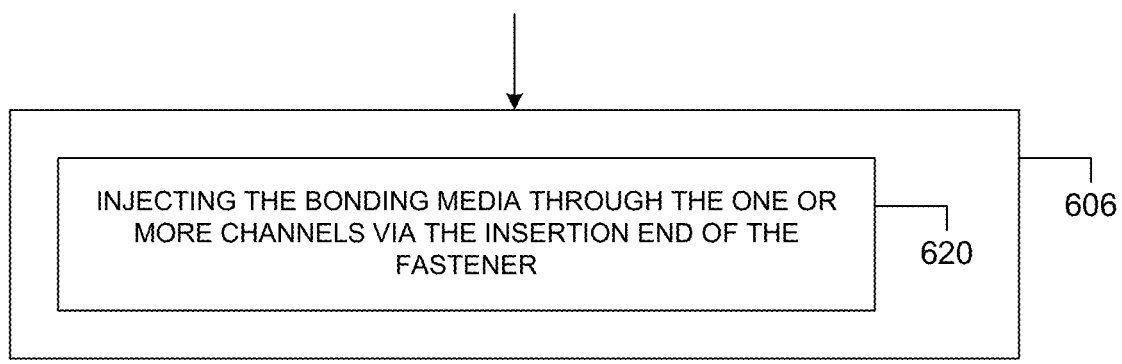
FIG. 10 illustrates a flowchart of a method for use with the method shown in FIG. 6, according to an example implementation.

FIG. 10 illustrates a flowchart of a method for use with the method 600 shown in FIG. 6, according to an example implementation. In particular, FIG. 10 illustrates block 620, which is performed in accordance with block 606. Further, FIG. 10 corresponds to examples in which the fastener 218 includes an insertion end 220 and a coupling end 222, and the one or more channels originate at the insertion end 220. At block 620, the method 600 includes injecting the bonding media 306 through the one or more channels via the insertion end 220 of the fastener 210. In this manner, a fastener can be provided to provide an initial floating connection to the outer structure 202 and the interior structure 204, while also facilitating providing the bonding media 306 to provide a more permanent and fixed connection.

Figure 11:
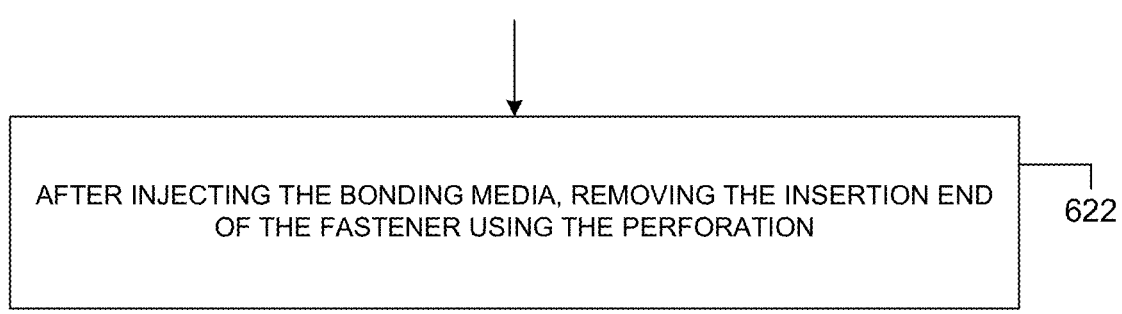
FIG. 11 illustrates a flowchart of a method for use with the method shown in FIG. 6, according to an example implementation.

FIG. 11 illustrates a flowchart of a method for use with the method 600 shown in FIG. 6, according to an example implementation. In particular, FIG. 11 illustrates block 622. Further, FIG. 11 corresponds to examples in which the fastener 210 further includes a perforation 226. The perforation 226 may be a portion of the fastener 210 that is relatively weakened and designed to fail under prescribed circumstances. At block 622, the method 600 includes, after injecting the bonding media 306, removing the insertion end 220 of the fastener 210 using the perforation 226. In this manner, an excess portion of the fastener 210 can be removed after forming the bonded structure.

Figure 12:
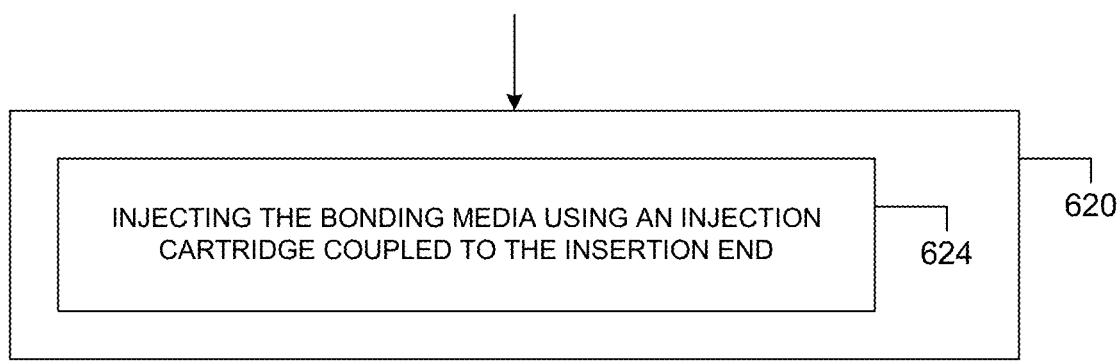
FIG. 12 illustrates a flowchart of a method for use with the method shown in FIG. 6, according to an example implementation.

FIG. 12 illustrates a flowchart of a method for use with the method 600 shown in FIG. 6, according to an example implementation. In particular, FIG. 12 illustrates block 624, which is performed in accordance with block 620. At block 624, the method 600 includes injecting the bonding media 306 using an injection cartridge (e.g., the first injection cartridge 302) coupled to the insertion end 220. For example, this may be performed as described above with respect to FIGS. 3 and 4.

Figure 13:
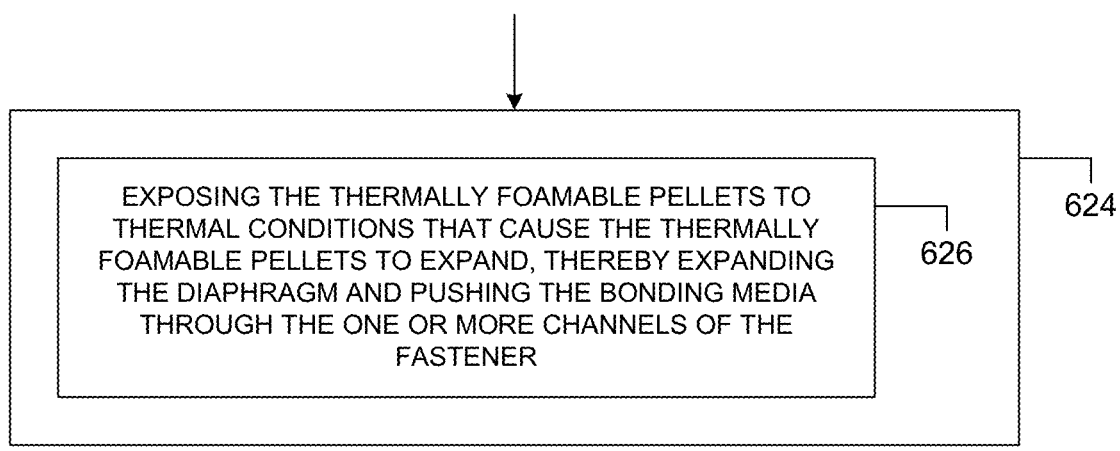
FIG. 13 illustrates a flowchart of a method for use with the method shown in FIG. 6, according to an example implementation.

FIG. 13 illustrates a flowchart of a method for use with the method 600 shown in FIG. 6, according to an example implementation. In particular, FIG. 13 illustrates block 626, which is performed in accordance with block 624. Further, FIG. 13 corresponds to examples in which the injection cartridge includes a housing 304 coupled to the insertion end 220 of the fastener 210 and configured to hold the bonding media 306. The injection cartridge (e.g., the first injection cartridge 302) further includes a diaphragm 308. The injection cartridge further includes a plurality of thermally foamable pellets 310 disposed in the diaphragm 308 and configured to expand in response to a change in temperature. The injection cartridge further includes a pressure cap 312 that contains the thermally foamable pellets 310 within the diaphragm 308. For example, the injection cartridge may be configured as illustrated in FIG. 3. At block 626, the method 600 includes exposing the thermally foamable pellets 310 to thermal conditions that cause the thermally foamable pellets 310 to expand, thereby expanding the diaphragm 308 and pushing the bonding media 306 through the one or more channels of the fastener 210. For example, this may be performed as described above with respect to FIGS. 3 and 4.

Figure 14:
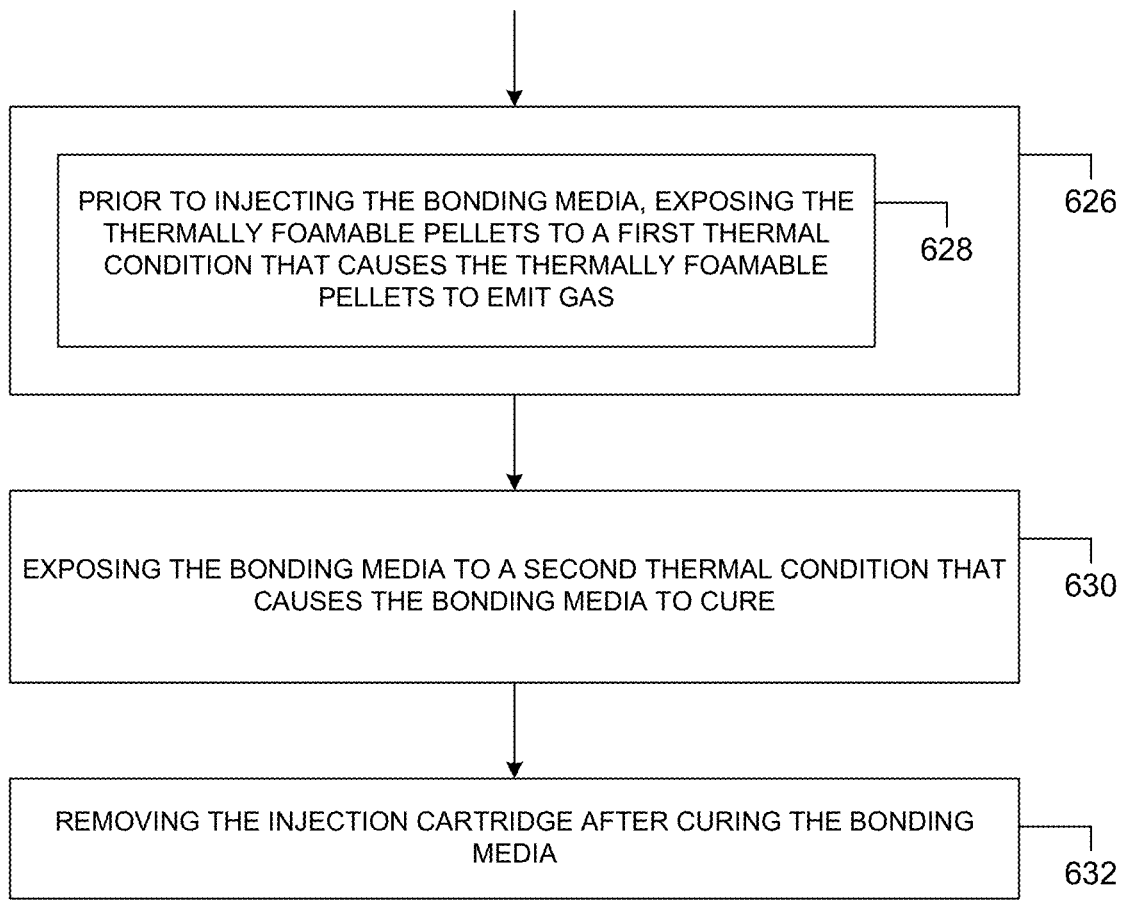
FIG. 14 illustrates a flowchart of a method for use with the method shown in FIG. 6, according to an example implementation.

FIG. 14 illustrates a flowchart of a method for use with the method 600 shown in FIG. 6, according to an example implementation. In particular, FIG. 14 illustrates blocks 628-632. Block 628 is performed in accordance with block 626. At block 628, the method 600 includes, prior to injecting the bonding media 306, exposing the thermally foamable pellets 310 to a first thermal condition that causes the thermally foamable pellets 310 to expand. For example, the first thermal condition may be a temperature between room temperature and a curing temperature for the bonding media 306. At block 628, the method 600 includes exposing the bonding media 306 to a second thermal condition that causes the bonding media 306 to cure. For example, the bonding media can be any temperature at which the bonding media 306 is designed to cure (e.g., between 250 degrees Fahrenheit and 350 degrees Fahrenheit). At block 628, the method 600 includes removing the injection cartridge (e.g., the first injection cartridge 302) after curing the bonding media 306.

Method 600 can be performed in parallel to form a plurality of bonded structures that collectively form a larger structure, such as a wing. However, example contexts for such assembly can be found in automotive, maritime, aeronautic, or astronautic implementations. Other example contexts for such assembly are possible as well.

Thus, the methods and systems described herein provide for flexible, partially constrained, and simple assembly of structures at an initial stage, and structures which are accurate and sturdy once fully assembled. Further, providing a bonding media for forming the structure using thermally foamable pellets allows for the bonding media to be injected into the structure at the same time that an environment is being prepared for curing the bonding media. This can further simplify and expedite the assembly process for a structure.

By the term "substantially," "similarity," and "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination or any sub-combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A bonded structure comprising:
an outer structure comprising a close tolerance hole associated with a first accuracy level;
an interior structure comprising an oversized hole associated with a second accuracy level that is different from the first accuracy level;
an elastomeric grommet disposed in the oversized hole;
one or more spacers between the outer structure and the interior structure providing a space between the outer structure and the interior structure;
a fastener positioned in the close tolerance hole and in the oversized hole, wherein the fastener comprises a channel inside the fastener having an open end at an insertion end of the fastener; and
a bonding media disposed in the space between the outer structure and the interior structure and disposed in the channel of the fastener, wherein the bonding media, the elastomeric grommet, and the oversized hole collectively position the interior structure relative to the outer structure.

2. The bonded structure of claim 1, further comprising:
a wing box, wherein the outer structure corresponds to the wing box; and
a wing rib, wherein the interior structure corresponds to the wing rib.

3. The bonded structure of claim 2, wherein the interior structure corresponding to the wing rib is a bracket connected to the wing rib.

4. The bonded structure of claim 2, further comprising:
a plurality of longerons, wherein the close tolerance hole corresponds to a connection to the wing box, and wherein the oversized hole corresponds to a connection to a longeron of the plurality of longerons.

5. The bonded structure of claim 1, wherein the bonding media comprises a cured bonding media.

6. The bonded structure of claim 1, wherein the elastomeric grommet comprises a first thickness at a first end and a second thickness at a second end, wherein the first thickness is greater than the second thickness, and wherein the first end and the second end are positioned within the oversized hole so as to displace the fastener within the oversized hole and thereby compress the interior structure towards the outer structure.

7. The bonded structure of claim 1, wherein the bonding media is provided to the space between the outer structure and the interior structure via the insertion end of the fastener.

8. A method for forming a bonded structure, the method comprising:
positioning an outer structure and an interior structure relative to one another such that a space between the outer structure and the interior structure for receiving bonding media is provided by one or more spacers between the outer structure and the interior structure, wherein the outer structure comprises a close tolerance hole associated with a first accuracy level, and the interior structure comprises an oversized hole associated with a second accuracy level that is different from the first accuracy level;
inserting a fastener in the close tolerance hole, the oversized hole, and in an elastomeric grommet disposed in the oversized hole, wherein the fastener comprises a channel inside the fastener having an open end at an insertion end of the fastener;
placing a bonding media in the channel and in the space between the outer structure and the interior structure; and
curing the bonding media to bond the outer structure to the interior structure, wherein the bonding media, the elastomeric grommet, and the oversized hole collectively position the interior structure relative to the outer structure.

9. The method of claim 8, wherein positioning the outer structure and the interior structure relative to one another such that a space for receiving bonding media is provided between the outer structure and the interior structure comprises positioning the outer structure and the interior structure using a spacer that maintains the space for receiving the bonding media.

10. The method of claim 9, further comprising:
prior to injecting the bonding media through the fastener, positioning an edge seal at an edge of the spacer, wherein the edge seal is configured to contain the bonding media during injection and as the bonding media cures; and
removing the edge seal from the spacer after the bonding media cures.

11. The method of claim 10, further comprising:
coupling a pressure plate to the spacer to apply pressure to the edge seal as the bonding media cures; and
removing the pressure plate after the bonding media cures, wherein removal of the pressure plate facilitates removal of the edge seal.

12. The method of claim 8, wherein injecting the bonding media through the fastener comprises injecting the bonding media through the channel via the insertion end of the fastener.

13. The method of claim 12, wherein injecting the bonding media through the channel via the insertion end of the fastener comprises injecting the bonding media using an injection cartridge coupled to the insertion end.

14. The method of claim 13, wherein the injection cartridge comprises:
a housing coupled to the insertion end of the fastener and configured to hold the bonding media;
a diaphragm;
a plurality of thermally foamable pellets disposed in the diaphragm and configured to expand in response to a change in temperature; and
a pressure cap that contains the thermally foamable pellets within the diaphragm, and
wherein injecting the bonding media using the injection cartridge comprises exposing the thermally foamable pellets to thermal conditions that cause the thermally foamable pellets to expand, thereby expanding the diaphragm and pushing the bonding media through the channel of the fastener.

15. The method of claim 14, wherein exposing the thermally foamable pellets to thermal conditions that cause the thermally foamable pellets to expand comprises:
prior to injecting the bonding media, exposing the thermally foamable pellets to a first thermal condition that causes the thermally foamable pellets to expand, the method further comprising:
exposing the bonding media to a second thermal condition that causes the bonding media to cure; and
removing the injection cartridge after curing the bonding media.

16. A system for forming a bonded wing, the system comprising:
a wing box;
a plurality of wing ribs;
a plurality of longerons;
a wing skin covering the wing box, the plurality of wing ribs, and the plurality of longerons; and
a plurality of bonded structures, wherein each bonded structure comprises:
an outer structure corresponding to the wing box, wherein the outer structure comprises a close tolerance hole associated with a first accuracy level;
an interior structure corresponding to a wing rib of the plurality of wing ribs, wherein the interior structure comprises an oversized hole associated with a second accuracy level that is different from the first accuracy level;
an elastomeric grommet disposed in the oversized hole;
one or more spacers between the outer structure and the interior structure providing a space between the outer structure and the interior structure;
a fastener positioned in the close tolerance hole and in the oversized hole, wherein the fastener comprises a channel inside the fastener having an open end at an insertion end of the fastener; and a bonding media disposed in the space between the outer structure and the interior structure and disposed in the channel of the fastener, wherein the bonding media, the elastomeric grommet, and the oversized hole collectively position the interior structure relative to the outer structure.

17. The system of claim 16, further comprising an injection cartridge coupled to the insertion end of the fastener and configured to provide the bonding media to the space between the outer structure and the interior structure via the insertion end of the fastener.

18. The system of claim 17, wherein the injection cartridge comprises:

a housing coupled to the insertion end of the fastener and configured to hold the bonding media;

a diaphragm;

a plurality of thermally foamable pellets disposed in the diaphragm and configured to expand in response to a change in temperature; and a pressure cap that contains the thermally foamable pellets within the diaphragm, wherein pressure from expanding the thermally foamable pellets provides the bonding media to the space between the outer structure and the interior structure via the housing.

19. The system of claim 16, further comprising an edge seal configured to contain the bonding media as the bonding media cures, wherein the edge seal is configured for removal after the bonding media cures.

20. The system of claim 19, further comprising a pressure plate coupled to the one or more spacers and configured to apply pressure to the edge seal as the bonding media cures, wherein the pressure plate is configured for removal after the bonding media cures, and wherein removal of the pressure plate facilitates removal of the edge seal.

* * * * *